United States Patent

Nakatsugawa

Patent Number: 6,138,165
Date of Patent: *Oct. 24, 2000

[54] ADDRESS SETTING METHOD AND COMMUNICATION SYSTEM EMPLOYING THE ADDRESS SETTING METHOD IN A MULTIPLE RING NETWORK UTILIZING VARIABLY SET ADDRESSES AND ADDRESS WRITE ENABLE/DISABLE STATES

[75] Inventor: Yoshinori Nakatsugawa, Shizuoka, Japan

[73] Assignee: Yazaki Corporation, Tokyo, Japan

[ * ] Notice: This patent is subject to a terminal disclaimer.

[21] Appl. No.: 09/100,316

[22] Filed: Jun. 19, 1998

[30] Foreign Application Priority Data

Jun. 20, 1997 [JP] Japan ..................... 9-164264

[51] Int. Cl.[7] .................. G06F 15/16; G06F 15/177; H04J 3/24
[52] U.S. Cl. .................. 709/245; 709/220; 709/249; 709/250; 709/251; 370/475
[58] Field of Search .................... 709/220, 245, 709/249, 250, 251; 370/475

[56] References Cited

U.S. PATENT DOCUMENTS

| | | | |
|---|---|---|---|
| 5,204,858 | 4/1993 | Kinashi et al. | 370/400 |
| 5,287,343 | 2/1994 | Nakamura et al. | 370/243 |
| 5,477,547 | 12/1995 | Sugiyama | 370/401 |
| 5,623,496 | 4/1997 | Sagi . | |
| 5,781,552 | 7/1998 | Hashimoto | 370/447 |
| 5,815,668 | 9/1998 | Hashimoto | 709/238 |

FOREIGN PATENT DOCUMENTS

| | | |
|---|---|---|
| 0 436 932 | 7/1991 | European Pat. Off. . |
| 641 629 | 7/1990 | France . |
| 59-62245 | 4/1984 | Japan . |
| 62-283252 | 11/1988 | Japan . |
| 3-72740 | 3/1991 | Japan . |
| 4-326896 | 11/1992 | Japan . |

OTHER PUBLICATIONS

W.M. Loucks, et al., Computer Networks and ISDN Systems, No. 11, pp. 133–146, "Implementation of a Dynamic Address Assignment Protocol in a Local Area Network", Feb. 11, 1986.

*Primary Examiner*—Le Hien Luu
*Assistant Examiner*—Paul Kang
*Attorney, Agent, or Firm*—Oblon, Spivak, McClelland, Maier & Neustadt, P.C.

[57] ABSTRACT

Relay station whose own address coincides with a destination address of communication data and whose own address write enable/disable state stored in the state storing means is in a write enable state can update its own address into a variably set address value in the communication data, then update the own address write enable/disable state into the write disable state, execute predetermined calculation of the variably set address value in the communication data, and transmit the communication data in which the variably set address value has been rewritten into a calculated value to a succeeding relay station so as to circulate sequentially between the plurality of relay stations.

12 Claims, 6 Drawing Sheets

ADDRESS SETTING METHOD AND COMMUNICATION SYSTEM EMPLOYING THE ADDRESS SETTING METHOD IN A MULTIPLE RING NETWORK UTILIZING VARIABLY SET ADDRESSES AND ADDRESS WRITE ENABLE/DISABLE STATES

BACKGROUND OF THE INVENTION

1. Field of the Invention

The present invention relates to an address setting method which can be used in a communication system constructed by connecting a plurality of ring type networks mutually via a plurality of relay stations in a data exchangeable manner and also can set their own addresses to the plurality of relay stations respectively to enable mutual discrimination of their identity. More particularly, the present invention relates to an address setting method capable of setting their own addresses to a plurality of relay stations respectively based on simple process procedures and also improving throughput as a whole communication system in setting the addresses, and a communication system to which the address setting method is applied.

2. Description of the Prior Art

In the prior art, as disclosed in Patent Application Publication (KOKAI) Sho 59-62245, for example, the communication system has been commonly known in which a plurality of local area networks (abbreviated as "LANs" hereinafter) for carrying out data exchange between a plurality of communication stations are connected via a plurality of relay stations such as gate ways to enable data exchange between different LANs.

In the communication system in the prior art, upon carrying out data exchange between different LANs, addresses to enable mutual discrimination of their own identity must be allocated previously to a plurality of relay stations respectively.

Therefore, in the prior art, as disclosed in Patent Application Publication (KOKAI) Hei 4-326896, for example, the address setting method used in the communication system in which at least one master apparatus and a plurality of slave apparatuses are connected on the same communication bus has been publicly known.

In the communication system disclosed in the above Publication, each of the plurality of slave apparatuses comprises a storing means for storing its own communication address updatably and a connection requesting means for transmitting its own connection requesting information to the master apparatus upon starting the communication system, while at least one master apparatus comprises a communication address setting means for setting the communication address of the slave apparatus as the source of such connection requesting information to another address being different from other slave apparatuses mutually and then informing the concerned slave apparatus of such set communication address when it receives the above connection requesting information.

According to the above communication system, the connection requesting means in each slave apparatus can transmit its own connection requesting information to the master apparatus at the time of starting the communication system while, when the communication address setting means in the master apparatus receives the above connection requesting information from each slave apparatus, it can set the communication address of the slave apparatus as the source of such connection requesting information to another address being different from other slave apparatuses mutually and then informing the concerned slave apparatus of the set communication address. Hence, even though a plurality of slave apparatuses are connected on the same communication bus, the address to enable mutual. discrimination of their identity can be set firmly to each slave apparatus.

However, according to the address setting method in the above communication system in the prior art, the master apparatus, when receiving the connection requesting information from respective slave apparatuses, has allocated/set the communication address of the slave apparatus as the source of such connection requesting information to be different from addresses of remaining slave apparatuses mutually and then returned/informed the set communication address to/of the concerned slave apparatus individually. Hence, the address settingmethod in the prior art has such a problem to be overcome that process procedures for exchanging data including the connection requesting information, the communication address, etc. between the master apparatus and the plurality of slave apparatuses individually are complicated.

In addition, a total sum of time consumed to carry out data exchange individually, i.e., a time required for address setting has tended to become longer. As a result, the address setting method in the prior art has also another problem to be overcome that it is difficult to improve throughput as a whole communication system in setting addresses.

SUMMARY OF THE INVENTION

The present invention has been made in view of the above circumstances and it is an object of the present invention to provide an address setting method capable of setting their own addresses to a plurality of relay stations respectively based on simple process procedures to enable mutual discrimination of their identity and also improving throughput as a whole communication system remarkably in setting the addresses, and a communication system to which the address setting method is applied.

In order to achieve the above object, there is provided an address setting method which is used in a communication system constructed by connecting a plurality of ring type networks mutually via a plurality of relay stations in a data exchangeable manner and also allocate/set their own addresses to the plurality of relay stations respectively by circulating communication data between the plurality of relay stations sequentially so as to enable mutual discrimination of their identity, any one of the plurality of ring type networks being constructed to include any one source relay station as a source of the communication data, the method comprising the steps of: initializing own addresses stored in the own address storing means of the plurality of relay stations into a predetermined value which is common to the plurality of relay stations and initializing their own address write enable/disable states stored in the state storing means of the plurality of relay stations into write enable states, at the plurality of relay stations except the source relay station, when own address allocate/set processes for the plurality of relay stations are started; transmitting the communication data, in which a predetermined value common to the plurality of relay stations is described in a destination address area in which a destination address of the relay station acting as a destination of the communication data is described and the variably set address as any initial value is described in the variably set address describing area in which a variably set address allocated/set to the plurality of relay stations respectively is described, to one relay station out of the plurality of relay stations except own relay station, at the source relay station; and updating the own address stored in the own address storing means into the variably set address value described in the variably set address describing area of the communication data and updating the own address write enable/disable state stored in the state storing means into the write disable state when the destination address of the communication data coincides with own address and an own address write enable/disable state stored in the state storing means is in a write enable state, executing predetermined calculation of the variably set address value described in the variably set address describing area of the communication data, describing the variably set address value acquired by the calculation into the variably set address describing area of the communication data to update, and transmitting the communication data in which the variably set address value has been rewritten to a succeeding relay station including own relay station, at the plurality of relay stations including the source relay station.

According to the address setting method, the plurality of relay stations except the source relay station initializes own addresses stored in the own address storing means of the plurality of relay stations into a predetermined value which is common to the plurality of relay stations and initializes their own address write enable/disable states stored in the state storing means of the plurality of relay stations into write enable states, when own address allocate/set processes for the plurality of relay stations are started. Then the source relay station transmits the communication data, in which a predetermined value common to the plurality of relay stations is described in a destination address area in which a destination address of the relay station acting as a destination of the communication data is described and the variably set address as any initial value is described in the variably set address describing area in which a variably set address allocated/set to the plurality of relay stations respectively is described, to one relay station out of the plurality of relay stations except own relay station. Then, the plurality of relay stations including the source relay station updates the own address stored in the own address storing means into the variably set address value described in the variably set address describing area of the communication data and updates the own address write enable/disable state stored in the state storing means into the write disable state when the destination address of the communication data coincides with own address and an own address write enable/disable state stored in the state storing means is in a write enable state, executes predetermined calculation of the variably set address value described in the variably set address describing area of the communication data, describes the variably set address value acquired by the calculation into the variably set address describing area of the communication data to update, and transmits the communication data in which the variably set address value has been rewritten to a succeeding relay station including own relay station.

In a preferred embodiment of the present invention, the plurality of relay stations except the source relay station are constructed to have four input/output terminals including a pair of first and second input terminals and a pair of first and second output terminals, and also constructed such that a pair of networks are connected by connecting a first input terminal and a first output terminal to one network of the pair of networks and connecting a second input terminal and a second output terminal to other network, the communication data further comprises a first area in which an accumulated value of a number of the communication data passing through the second output terminal of the plurality of relay stations except the source relay station is described, and a second area in which an accumulated value of a number of the communication data passing through the first output terminal after the communication data have passed through the second output terminal of the plurality of relay stations except the source relay station is described, the source relay station transmits the communication data, in which a predetermined value common to the plurality of relay stations is described in the destination address area, the variably set address as any initial value is described in the variably set address describing area, the accumulated value of the number of the communication data passing through the second output terminal is described in the first area, and the accumulated value of the number of the communication data passing through the first output terminal after the communication data have passed through the second output terminal is described in the second area, to one relay station out of the plurality of relay stations except own relay station, and when the destination address of the received communication data coincides with own address and an own address write enable/disable state stored in the state storing means is in a write enable state, the plurality of relay stations except the source relay station updates the own address stored in the own address storing means into the variably set address value described in the variably set address describing area of the communication data, updates the own address write enable/disable state stored in the state storing means into the write disable state, execute predetermined calculation of the variably set address value described in the variably set address describing area of the communication data, describes the variably set address value acquired by the calculation in the variably set address describing area of the communication data to update, describes the accumulated value of the number of the communication data passing through the second output terminal in the first area of the communication data, and transmits the communication data in which the variably set address value and the accumulated value of the number of the communication data passing through the second output terminal have been rewritten to a succeeding relay station including own relay station, otherwise, when the destination address of the received communication data does not coincide with own address, the plurality of relay stations except the source relay station describes the accumulated value of the number of the communication data passing through the first output terminal in the second area and then transmits the communication data in which the accumulated value of the number of the communication data passing through the first output terminal has been rewritten toward a succeeding relay station including its own station.

In a preferred embodiment of the present invention, when the destination address of the received communication data does not coincide with own address, the plurality of relay stations except the source relay station describes the accumulated value of the number of the communication data passing through the first output terminal in the second area, determines whether or not the accumulated value of the number of the communication data passing through the first output terminal coincides with the accumulated value of the number of the communication data passing through the second output terminal, transmits the communication data in which both values are still kept as they are to the succeeding relay station including own relay station if both the accumulated values do not coincide with each other, otherwise transmits the communication data in which both values are updated into any initial value are to the succeeding relay station including own relay station if both the accumulated values coincides with each other.

In a preferred embodiment of the present invention, when the communication data is transmitted, the source relay station initializes own addresses stored in the own address storing means into a predetermined value which is common to the plurality of relay stations and initializes their own address write enable/disable states stored in the state storing means into write enable states, and when the destination address of the received communication data coincides with own address and an own address write enable/disable state stored in the state storing means is in a write disable state, the plurality of relay stations including the source relay station inverts the own address write enable/disable state stored in the state storing means into the write enable state once, updates the own address stored in the own address storing means into a previously set predetermined value, inverts the own address write enable/disable state into the write disable state again, then terminates address setting normally.

In order to achieve the above object, there is also provided a communication system which is constructed by connecting a plurality of ring type networks mutually via a plurality of relay stations in a data exchangeable manner and to which an address setting method of allocating/setting their own addresses to the plurality of relay stations respectively by circulating communication data between the plurality of relay stations sequentially so as to enable mutual discrimination of their identity is applied, the communication data comprising at least a destination address area in which a destination address of the relay station acting as a destination of the communication data is described, and a variably set address describing area in which a variably set address allocated/set to the plurality of relay stations respectively is described, and any one of the plurality of ring type networks being constructed to include any one source relay station as a source of the communication data, and the plurality of relay stations including the source relay station comprising an own address storing means for storing respective own addresses, and a state storing means for storing write enable/disable states of their own addresses stored in the own address storing means, the plurality of relay stations except the source relay station comprising an initializing means for initializing own addresses stored in the own address storing means of the plurality of relay stations into a predetermined value which is common to the plurality of relay stations and initializing their own address write enable/disable states stored in the state storing means of the plurality of relay stations into write enable states, when own address allocate/set processes for the plurality of relay stations are started; the source relay station comprising a source transmitting means for transmitting the communication data, in which a predetermined value common to the plurality of relay stations is described in the destination address area and the variably set address as any initial value is described in the variably set address describing area, to one relay station out of the plurality of relay stations except own relay station; and the plurality of relay stations including the source relay station comprising, a communication data receiving means for receiving the communication data, an updating means for updating the own address stored in the own address storing means into the variably set address value described in the variably set address describing area of the communication data and updating the own address write enable/disable state stored in the state storing means into the write disable state, when the destination address of the communication data coincides with own address and an own address write enable/disable state stored in the state storing means is in a write enable state, a calculating means for executing predetermined calculation of the variably set address value described in the variably set address describing area of the communication data, and a communication data transmitting means for describing the variably set address value acquired by the calculation into the variably set address describing area of the communication data, and transmitting the communication data in which the variably set address value has been rewritten to a succeeding relay station including own relay station.

According to the invention, in the plurality of relay stations except the source relay station, an initializing means initializes own addresses stored in the own address storing means of the plurality of relay stations into a predetermined value which is common to the plurality of relay stations and initializes their own address write enable/disable states stored in the state storing means of the plurality of relay stations into write enable states, when own address allocate/ set processes for the plurality of relay stations are started. In the source relay station, a source transmitting means transmits the communication data, in which a predetermined value common to the plurality of relay stations is described in the destination address area and the variably set address as any initial value is described in the variably set address describing area, to one relay station out of the plurality of relay stations except own relay station. In the plurality of relay stations including the source relay station, a communication data receiving means receives the communication data; an updating means updates the own address stored in the. own address storing means into the variably set address value described in the variably set address describing area of the communication data and updates the own address write enable/disable state stored in the state storing means into the write disable state, when the destination address of the communication data coincides with own address and an own address write enable/disable state stored in the state storing means is in a write enable state; a calculating means executes predetermined calculation of the variably set address value described in the variably set address describing area of the communication data; and a communication data transmitting means describes the variably set address value acquired, by the calculation into the variably set address describing area of the communication data, and transmits the communication data in which the variably set address value has been rewritten to a succeeding relay station including own. relay station.

In a preferred embodiment of the present invention, the plurality of relay stations except the source relay station are constructed to have four input/output terminals including a pair of first and second input terminals and a pair of first and second output terminals, and also constructed such that a pair of networks are connected by connecting a first input terminal and a first output terminal to one network of the pair of networks and connecting a second input terminal and a second output terminal to other network, the communication data further comprises a first area in which an accumulated value of a number of the communication data passing through the second output terminal of the plurality of relay stations except the source relay station is described, and a second area in which an accumulated value of a number of the communication data passing through the first output terminal after the communication data have passed through the second output terminal of the plurality of relay stations except the source relay station is described, the source relay station is constructed to include a source transmitting means for transmitting the communication data, in which a predetermined value common to the plurality of relay stations is described in the destination address area, the variably set address as any initial value is described in the variably set address describing area, the accumulated value of the number of the communication data passing through the second output terminal is described in the first area, and the accumulated value of the number of the communication data passing through the first output terminal after the communication data have passed through the second output terminal is described in the second area, to one relay station out of the plurality of relay stations except own relay station, and the plurality of relay stations except the source relay station are constructed to include, a communication data receiving means for receiving the communication data, an updating means for updating the own address stored in the own address storing means into the variably set address value described in the variably set address describing area of the communication data, and updating the own address write enable/disable state stored in the state storing means into the write disable state, when the destination address of the received communication data coincides with own address and an own address write enable/disable state stored in the state storing means is in a write enable state, a calculating means for executing predetermined calculation of the variably set address value described in the variably set address describing area of the communication data, and a communication data transmitting means, when the destination address of the received communication data coincides with own address and an own address write enable/disable state stored in the state storing means is in a write enable state, for describing the variably set address.value acquired by the calculation into. the variably set address describing area of the communication data, describing the accumulated value of the number of the communication data passing through the second output terminal in the first area of the communication data, and transmitting the communication data in which the variably set address value and the accumulated value of the number of the communication data passing through the second output terminal have been rewritten to a succeeding relay station including own relay station, otherwise, when the destination address of the received communication data does not coincide with own address, for describing the accumulated value of the number of the communication data passing through the first output terminal in the second area and then transmitting the communication data in which the accumulated value of the number of the communication data passing through the first output terminal has been rewritten toward a succeeding relay station including its own station.

In a preferred embodiment of the present invention, the communication data transmitting means of the plurality of relay stations except the source relay station, when the destination address of the received communication data does not coincide with own address, describes the accumulated value of the number of the communication data passing through the first output terminal in the second area, determines whether or not the accumulated value of the number of the communication data passing through the first output terminal coincides with the accumulated value of the number of the communication data passing through the second output terminal, transmits the communication data in which both values are still kept as they are to the succeeding relay station including own relay station if both the accumulated values do not coincide with each other, otherwise transmits the communication data in which both the accumulated values are updated into any initial value are to the succeeding relay station including own relay station if both the accumulated values coincides with each other.

The nature, principle and utility of the invention will become more apparent from the following detailed description when read in conjunction with the accompanying drawings.

DESCRIPTION OF THE PREFERRED EMBODIMENTS

An address setting method and a communication system to which the address setting method is applied according to embodiments of the present invention will be explained in detail with reference to the accompanying drawings hereinafter.

Figure 1:
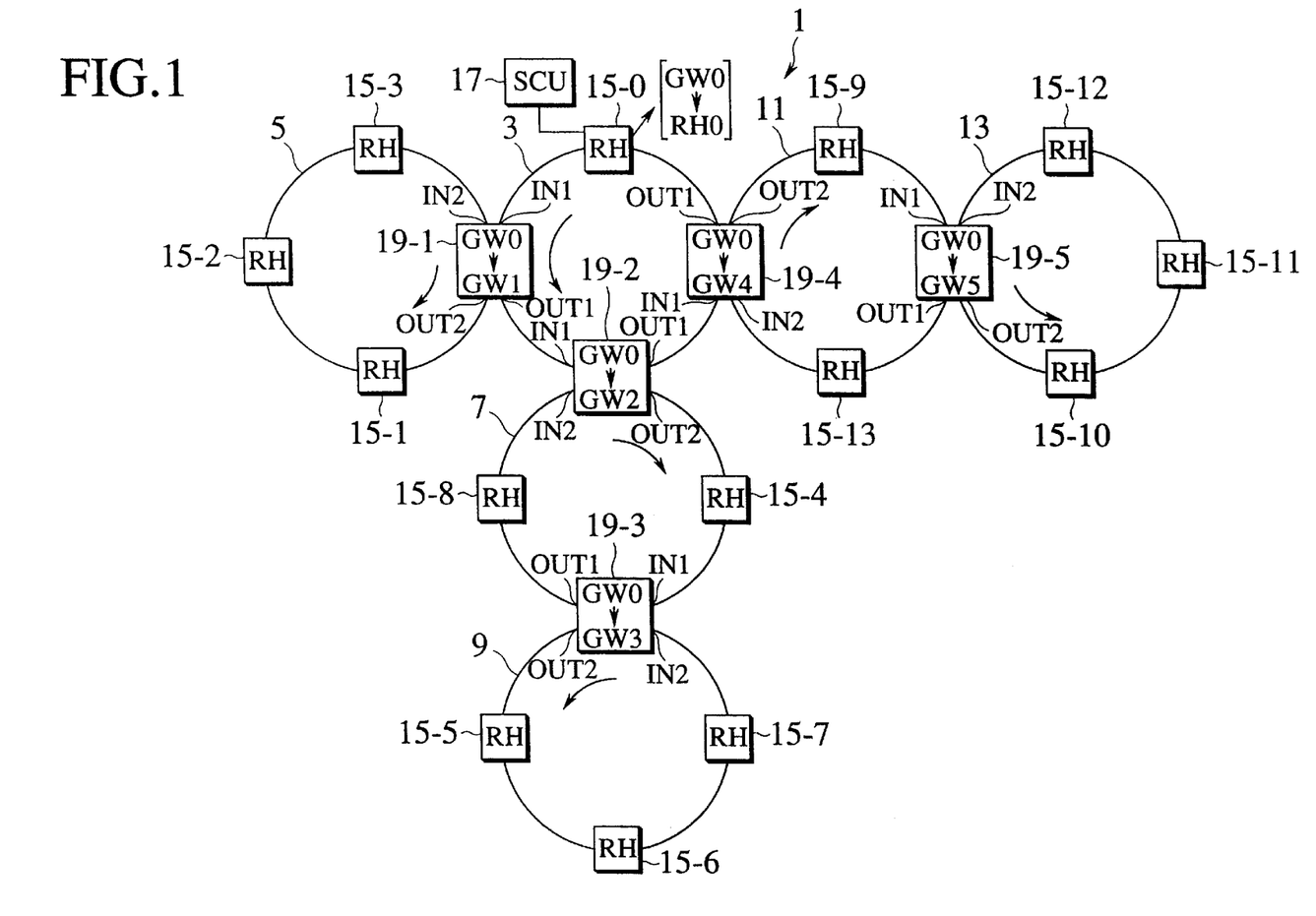
FIG. 1 is a schematic block diagram showing a configuration of a communication system to which an address setting method according to the present invention is applied.

First, as shown in FIG. 1, a communication system, to which an address setting method according to the present invention is applied, is constructed by connecting ring type first to sixth LANs 3, 5, 7, 9, 11, 13 via first to fifth gate ways (GW) 19-1, 19-2, 19-3, 19-4, 19-5, which are located as the relay stations, respectively so as to enable data exchange. These LANs 3, 5, 7, 9, 11, 13 are constructed by connecting a plurality of root hubs (RH) 15 via ring-like data transmission lines mutually.

A system control unit (referred to as "SCU" hereinafter) 17 is connected to the root hub (RH) 15-0 which is located as a source relay station belonging to a first LAN 3. The SCU 17 can manage collectively the synchronous control of the overall communication system 1 and the address setting process for respective functional devices (not shown), etc. Such functional devices are connected to respective gate ways (GW) 19, respective root hubs (RH) 15, and respective root hubs, all constituting the communication system 1, by the appropriate number respectively, etc. The present invention will be explained hereunder by illustrating the situation wherein the SCU 17 is connected to the root hub 15-0 belonging to the first LAN out of a plurality of ring type LANs, but it is not limited to such situation. Out of a plurality of ring type networks, the situation wherein the SCU 17 is connected to any one of root hubs belonging to any one network may be employed.

Figure 2:
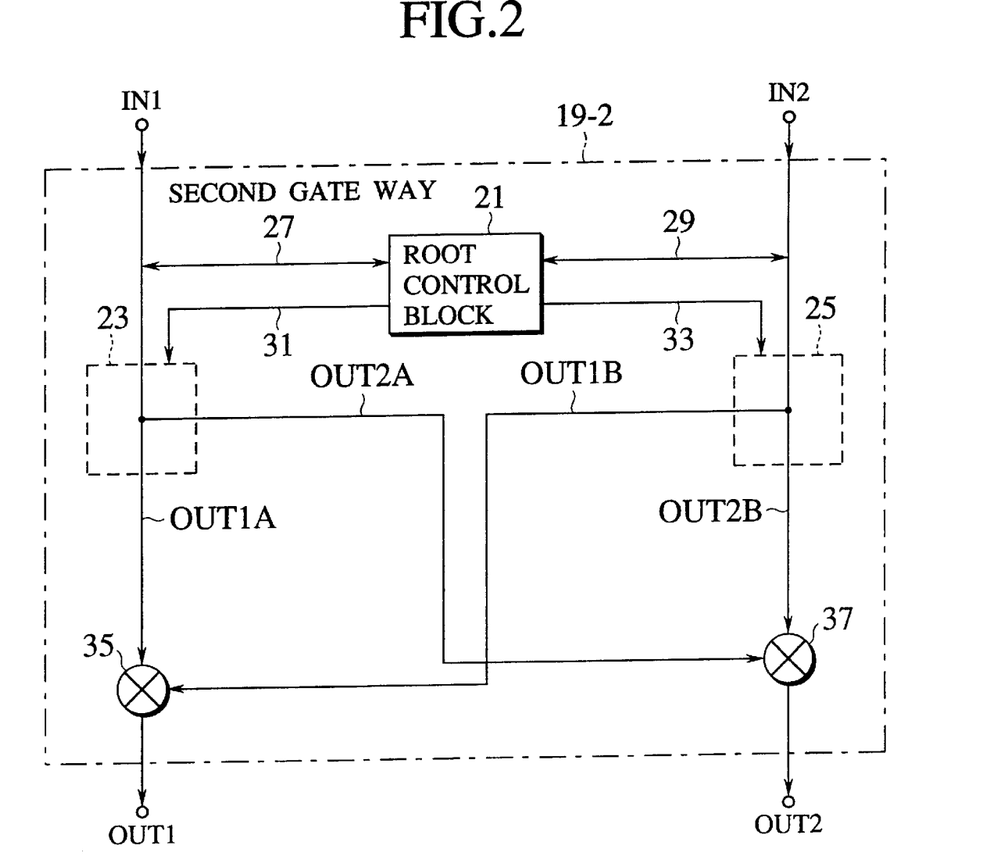
FIG. 2 is a block diagram showing a configuration of a relay station serving as a pertinent portion of the present communication system.

As shown in FIG. 2, each gate way (GW) is constructed to have four input/output terminals including a pair of first and second input terminals IN1, IN2 and a pair of first and second output terminals OUT1, OUT2. Also, the gate way (GW) is constructed to connect a pair of LANs by connecting the first input terminal IN1 and the first output terminal OUT1 to one LAN of the pair of LANs and also connecting the second input terminal IN2 and the second output terminal OUT2 to the other LAN.

Figure 4:
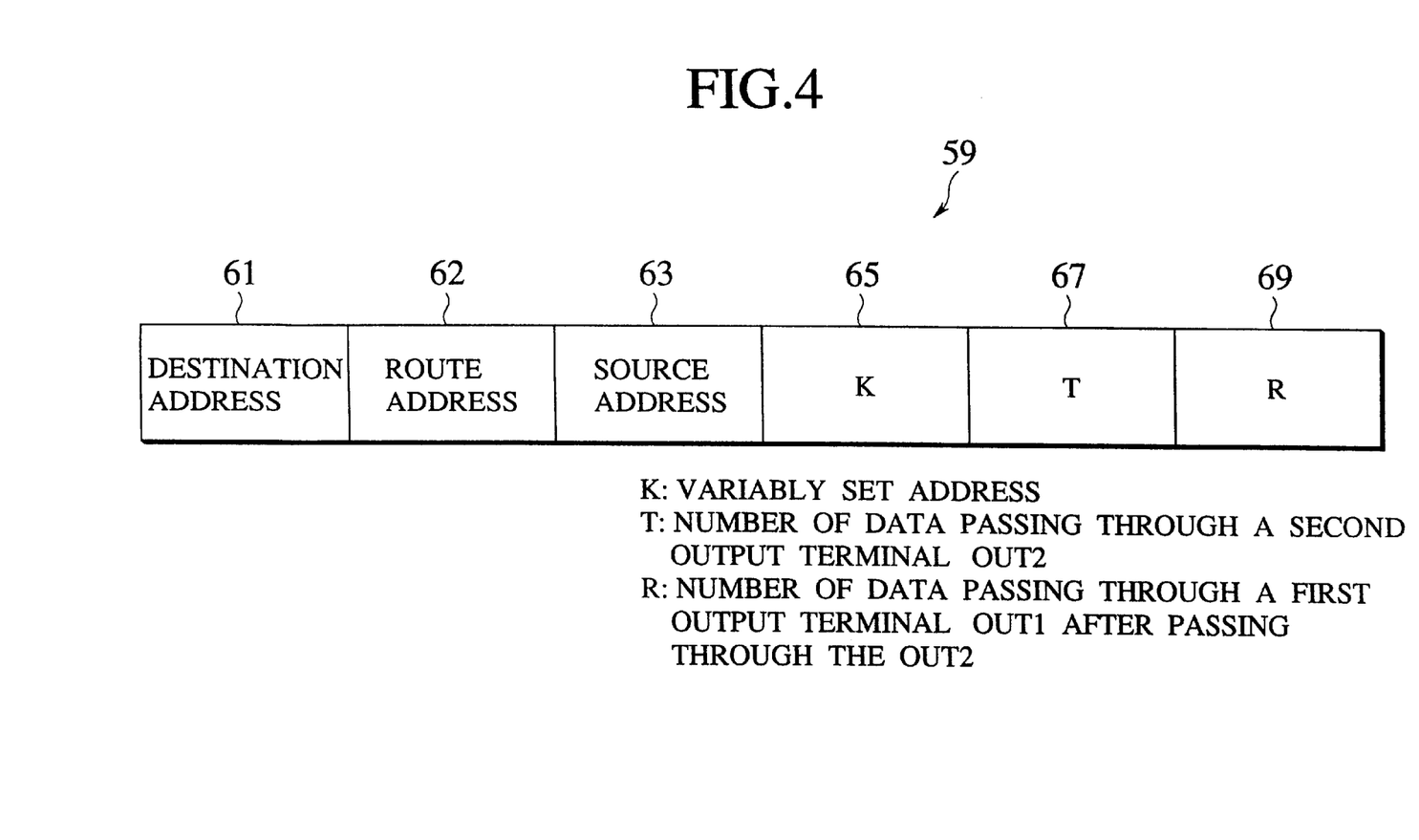
FIG. 4 is a view showing an example of a format of communication data used in the present communication system.

Now a format of communication data which are circulated in the present communication system 1 will be explained with reference to FIG. 4. A plurality of information description areas in which various information are described respectively are set in a cyclic command frame of the communication data 59. The plurality of information description areas are constructed to include a destination address area 61 in which a destination address of the communication data is described, a route address area 62 in which the route address constructed by arranging addresses of root hubs (RH) or gate ways (GW) existing at branch points in passing routes of the communication data from the source to the destination in their passing order is described, a source address area 63 in which the source address of the communication data is described, a variably set address description area 65 in which addresses as set objects relative to respective relay stations are described as the variably set address K, a second output terminal passing number accumulated value description area 67 in which an accumulated value T of the number of communication data passing through a second output terminal OUT2 of the gate way (GW) 19 is described, a first output terminal passing number accumulated value description area 69 in which an accumulated value R of the number of communication data passing through a first output terminal OUT1 is described after the communication data have passed through the second output terminal OUT2 of the gate way (GW) 19, and a data area (not shown) in which various instruction, control information, source data, or the like are described.

Next, by way of illustrating a second gate way 19-2 typically, a block configuration of the root hub (RH) or the gate way (GW) located as the relay station which can perform major functions in the present communication system 1 will be explained with reference to FIG. 2 hereunder.

As shown in FIG. 2, the second gate way 19-2 comprises four input/output terminals IN1, IN2, OUT1, OUT2 described above, a root control block 21, first and second route switching portions 23, 25, and first and second mixers 35, 37.

The root control block 21 is constructed such that it always monitors the presence of communication data, which are circulated in the first LAN 3 or the third LAN 7, via communication lines 27, 29 connected to the first and second input terminals IN1, IN2 respectively, then generates a route switching command signal, which switches selectively destination routes of the communication data in the gate way based on the destination address which has been described in a signal frame in the communication data, etc., if the communication data passing through the second gate way 19-2 exists as the result of this monitor, and then sends out the generated route switching command signal to the first and second route switching portions 23, 25 via communication lines 31, 33.

The first route switching portion 23 is constructed such that, in compliance with the route switching command signal which has been sent out from the root control block 21, it can switch a destination route of the communication data being input via the first input terminal IN1 to either of a route OUT1A for the first output terminal OUT1 or a route OUT2A for the second output terminal OUT2 selectively.

On the other hand, the second route switching portion is constructed such that, in compliance with the route switching command signal which has been sent out from the root control block 21, it can switch a destination route of the communication data being input via the second input terminal IN2 to either of a route OUT1B for the first output terminal OUT1 or a route OUT2B for the second output terminal OUT2 selectively.

The first mixer 35 is provided at a confluence point of the route OUT1A extending from the first route switching portion 23 to the first output terminal OUT1 and the route OUT1B extending from the second route switching portion 25 to the first output terminal OUT1, and is constructed to send out the communication data, which have passed through any one of the route OUT1A and route OUT1B, to the first output terminal OUT1.

On the other hand, the second mixer 37 is provided at a confluence point of the route OUT2A extending from the first route switching portion 23 to the second output terminal OUT2 and the route OUT2B extending from the second route switching portion 25 to the second output terminal OUT2, and is constructed to send out the communication data, which have passed through any one of the route OUT2A and route OUT2B, to the second output terminal OUT2.

Next, a block configuration of the above root control block 21 will be explained with reference to FIG. 3.

Figure 3:
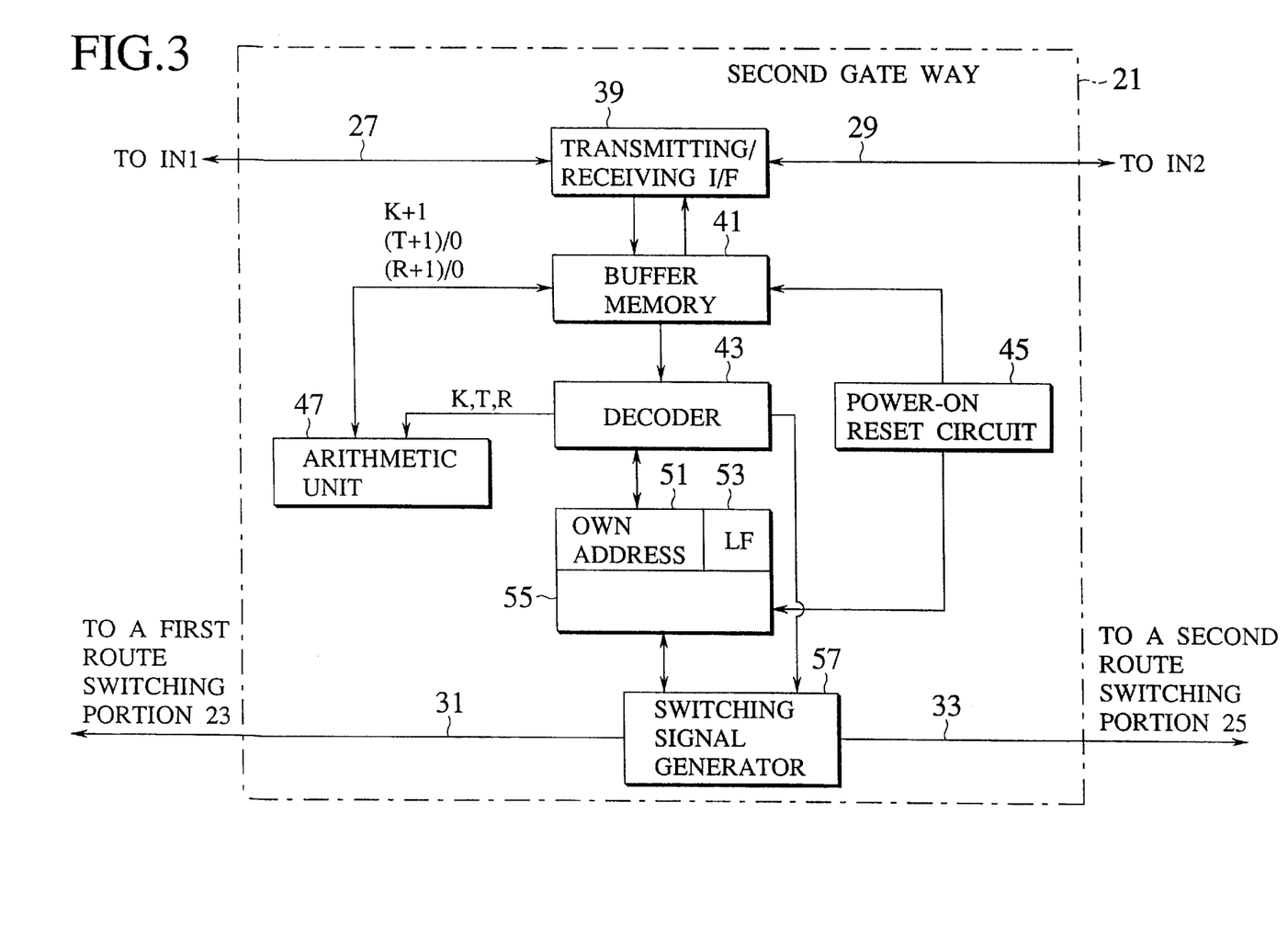
FIG. 3 is a block diagram showing an internal configuration of a root control block constituting a part of the relay station serving as the pertinent portion of the present communication system.

As shown in FIG. 3, the root control block 21 comprises a transmitting/receiving interface (an "interface" is abbreviated as an "I/F" hereinafter) 39, a buffer memory 41, a decoder 43, a power-on reset circuit 45, an arithmetic unit 47, an address/flag memory 55, and a switching signal generator 57.

The transmitting/receiving I/F 39 is constructed such that it can always monitor, via the communication lines 27, 29 connected to the first and second input terminals IN1, IN2 respectively, whether or not the communication data circulating in a pair of LANs 3, 7 respectively are present, and receive the communication data passing through the second gate way 19-2 itself and also transmit the communication data, in which variably set address K, etc. are updated selectively by the second gate way 19-2 itself, to a succeeding gate way.

The buffer memory 41 is constructed such that it can temporarily store the communication data if, as a result of monitoring in the transmitting/receiving I/F 39, the communication data passing through the second gate way 19-2 per se are present.

The power-on reset circuit 45 is constructed to initialize stored contents of the buffer memory 41 and the address/flag memory 55 to respective predetermined values when the power supply of the present communication system 1 is turn on.

The address/flag memory 55 comprises an address storing area 51 for storing own address of the second gate way 19-2 and a lock flag (LF) storing area 53 for storing a write enable/disable state indicating whether or not own address is in a write enable state, and is constructed to update the stored contents in compliance with a rewriting command sent out from the decoder 43 to be described in the following.

The decoder 43 is constructed to have an interpreting function, a data distributing/supplying function, and a own address setting/updating function. More particularly, the interpreting function can interpret a destination address, route address, source address, variably set address K, accumulated value T of the number of communication data passing through the second output terminal OUT2, and accumulated value R of the number of communication data passing through the first output terminal OUT1 after the communication data have passed through the second output terminal OUT2, all being described in a signal frame of the communication data stored in the buffer memory 41. The data distributing/supplying function can distribute and supply an interpreted destination address, etc. to the arithmetic unit 47, the address/flag memory 55, or the switching signal generator 57 respectively. The address setting/updating function can determine whether or not the interpreted destination address coincides with its own address of the second gate way 19-2 which is stored in the own address storing area 51 of the address/flag memory 55, then determine whether or not the lock flag (LF) read from the lock flag (LF) storing area 53 of the address/flag memory 55 is in its write enable state if the destination address has coincided with its own address as a result of this coincidence determination, then employ the variably set address K in the communication data as its own address if the lock flag (LF) has been in its address write enable state (LF=0) as a result of this state determination, and then store a value of the variably set address K in the own address storing area 51 of the address/flag memory 55.

The arithmetic unit 47 is constructed to have a function for calculating the variably set address, a function for calculating the accumulated value of the number of communication data passing through the second output terminal, and a function for calculating the accumulated value of the number of communication data passing through the first output terminal. More particularly, the function for calculating the variably set address can receive the variably set address K, the accumulated value T of the number of communication data passing through the second output terminal OUT2, and the accumulated value R of the number of communication data passing through the first output terminal OUT1 after the communication data have passed through the second output terminal OUT2, which being distributed/supplied from the decoder 43, then calculate K+1 by incrementing the variably set address K by one every time when updating of own address set in the address/flag memory 55 has been completed, and then send out a value of the variably set address K+1 to the buffer memory 41. The function for calculating the accumulated value of the number of communication data passing through the second output terminal can calculate T+1 by incrementing the accumulated value T of the number of communication data passing through the second output terminal OUT2 by one every time when the communication data pass through the second output terminal OUT2 of the gate way, and then send out a value of the accumulated value T+1 of the number of communication data passing through the second output terminal OUT2 to the buffer memory 41. The function for calculating the accumulated value of the number of communication data passing through the first output terminal can calculate R+1 by incrementing the accumulated value R of the number of communication data passing through the first output terminal OUT1 by one every time when the communication data pass through the first output terminal OUT1 after the communication data have passed through the second output terminal OUT2 of the gate way, and then send out a value of the accumulated value R+1 of the number of communication data passing through the first output terminal OUT1 to the buffer memory 41.

The switching signal generator 57 is constructed to generate a route switching command signal which causes to switch the destination route of the communication data in the gate way selectively, based on the destination address and the route address distributed/supplied from the decoder 43 and the stored contents of the address/flag memory 55, and then send out the generated route switching command signal to a first route switching portion 23 and a second route switching portion 25 via communication lines 31, 33 respectively.

Figure 5:
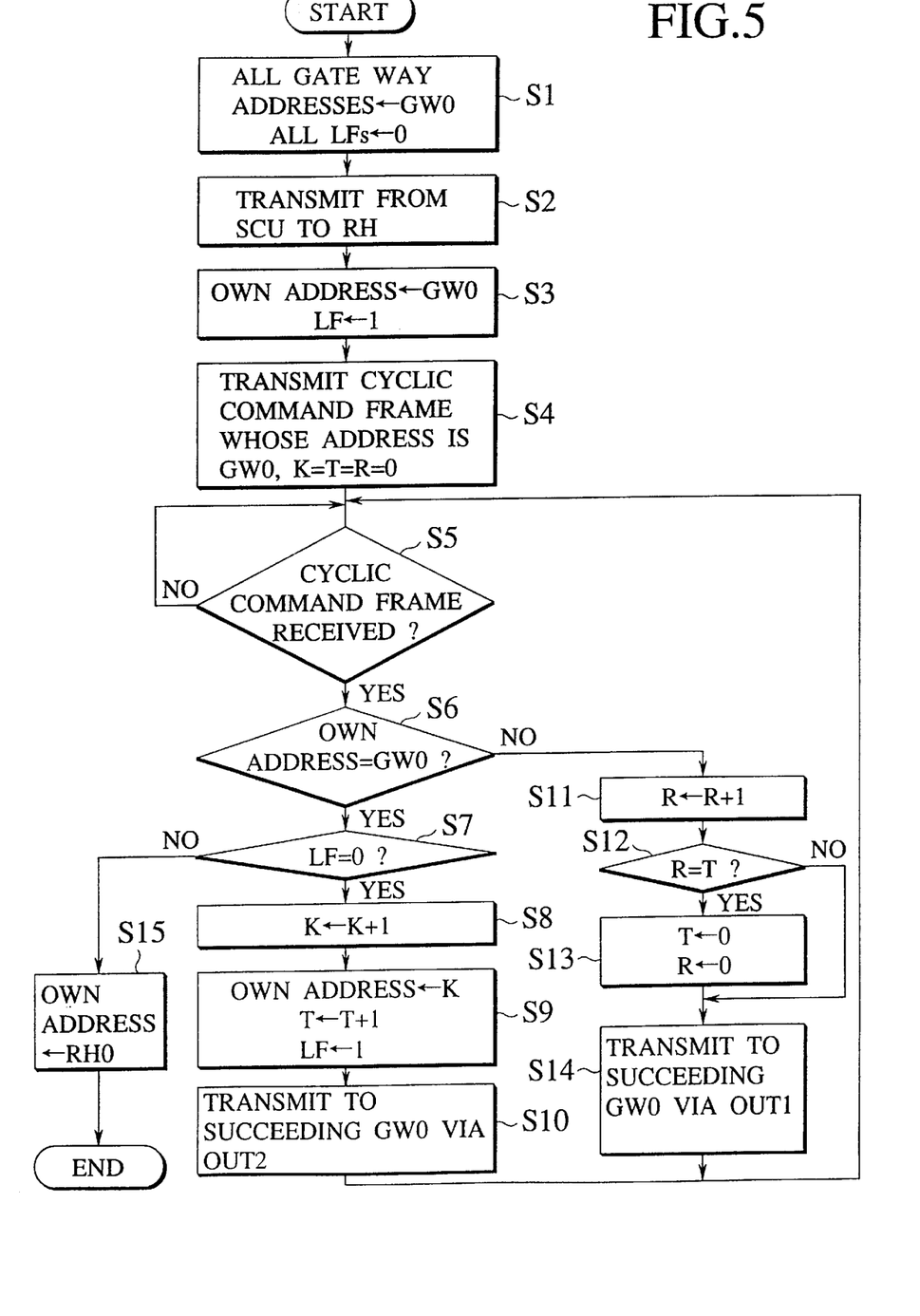
FIG. 5 is a flowchart showing process procedures of the address setting method according to the present invention.

While taking as an example the case where the communication data transmitted from the root hub 15-0 operating as the source relay station are circulated via a plurality of gate ways 19-1, 19-2, ..., 19-5 operating as the destination relay stations sequentially, process procedures of the address setting method applied to the present communication system 1 will be explained with reference to FIG. 5 hereunder.

First, when a power supply of the communication system 1 is turned on, a reset command portion (not shown) of the SCU 17 sends out are set command to the power-on reset circuits 45 of the gateways 19 respectively. In response to such a reset command, the power-on reset circuits 45 of the gate ways 19 send out the reset command to the buffer memory 41 and the address/flag memory 55 respectively to initialize stored contents of the buffer memory 41 and the address/flag memory 55 into predetermined values (step S1).

More particularly, the buffer memory 41 clears its stored contents. Also, the address/flag memory 55 sets their own addresses of respective gate ways stored in the own address storing area 51 to predetermined addresses, e.g., "GW0", which is common to all gate ways 19, and then initializes the write enable/disable state of its address stored in the lock flag (LF) storing area 53 to a write enable state (LF=0). In this case, irrespective of the reset command sent out from the reset command portion of the SCU 17, the power-on reset circuits 45 of the gate ways 19 may be constructed such that they can detect the power-on of the communication system 1 individually to initialize the stored contents of the buffer memory 41 and the address/flag memory 55 into predetermined values respectively.

Next, the SCU 17 transmits a command to start the address set process of the gate ways 19 toward the root hub (RH) 15-0 which can operate as the source relay station (step S2). In answer to this, the root hub 15-0 first sets its own address into "GW0", for example, and then sets its own lock flag (LF) into a write disable state of its own address (LF=1) (step S3).

After the own address has been set in step S3, the root hub 15-0 describes "GW0" in a destination address portion 61 as the destination address, then describes "GW0" in a source address portion 63 as the source address, then describes "0", for example, in a variably set address describing area 65 as the variably set address K, then describes "0", for example, in an area 67 for describing the accumulated value T of the number as the accumulated value T of the number of communication data passing through the second output terminal, then describes "0", for example, in an area 69 for describing the accumulated value R of the number as the accumulated value R of the number of communication data passing through the first output terminal after the communication data have passed through the second output terminal, and then transmits the communication data including a cyclic command frame having various initialized values and the address set command as the contents toward the gate way 19 (step S4). Although the case where the value "0" is set as the variably set address K, the accumulated value T of the number of communication data passing through the second. output terminal, and the accumulated value R of the number of communication data passing through the first output terminal after the communication data have passed through the second output terminal has been illustrated in step S4, the present invention is not limited to this embodiment. Any numerical values may be set appropriately as above K, T, R respectively.

Then, the transmitting/receiving I/F 39 of the root hub 15-0 or the gate way 19 is put on standby to receive the communication data including the cyclic command frame (step S5). If the transmitting/receiving I/F 39 has received the communication data transmitted from the root hub 15-0 or one of the plural gate ways 19 including own gate way during this standby state, it stores received communication data temporarily in the buffer memory 41. In the event that the communication data received this time have passed through the gate way 19 for the first time, such data are input into the gate way 19 via the first input terminal IN1. In contrast, unless such communication data have passed through the gate way 19 for the first time, such data are input into the gate way 19 via the second input terminal IN2.

The decoder 43 can interpret the destination address described in the destination address area 61 in the signal frame of the communication data read from the buffer memory 41, etc. and then determine whether or not the interpreted destination address (GW0) coincides with the address stored in the address/flag memory 55 (step S6). Further, if the destination address has coincided with the address as a result of this coincidence determination, the decoder 43 can further determine whether or not the write enable/disable state of the lock flag (LF) read from the lock flag (LF) storing area 53 of the address/flag memory 55 is in the write enable state (LF=0) (step S7).

The route addresses are not described at the time of setting the addresses of respective gate ways 19 since the addresses of respective gate ways 19 have not been set yet. Accordingly, the route addresses are never referred to at the time of setting the addresses of respective gate ways 19. However, if data exchange is executed between the root hubs belonging to different LANs respectively, for example, after the address set process of respective gate ways 19 has been completed, their own addresses of respective gate ways 19 which are positioned at branch points of the communication routes extending from the root hub as the source to the root hub as the destination are described in passing order in the route address describing area in the communication data as the route address, so that the communication route of the communication data can be designated uniquely by the route addresses.

As a result of this state determination in step S7, if the destination address and its own address has coincided with each other and also the lock flag (LF) has been in the write enable state (LF=0) of its own address in the gate way 19 which has received the communication data, i.e., if the communication data received this time has passed through the gate way 19 for the first time, the arithmetic unit 47 can calculate K+1 by incrementing the variably set address K, which has been interpreted and then sent out by the decoder 43, by one and then send out the variably set address K+1 to the buffer memory 41 (step S83).

Next, the decoder 43 can employ the variably set address K described in the communication data as its address, then update and store the address K in the address storing area 17 of the address/flag memory 55, and then set the lock flag (LF) to its write disable state (LF=1) of its own address by inverting the write enable/disable state of the lock flag (LF) stored in the lock flag (LF) storing area 53 of the address/flag memory 55. According to this update/set process of the address, if taking the gate way 19-1 shown in FIG. 1 as an example, own address "GW0" being set temporarily can be updated to "GW1" and then stored. In addition, the arithmetic unit 47 can calculate T+1 by incrementing by one the accumulated value T of the number of communication data passing through the second output terminal, which has been interpreted by the decoder 43 and then sent out therefrom, and then send out the accumulated value T+1 of the number of communication data passing through the second output terminal to the buffer memory 41.

In steps S8 and S9, out of the description contents in the communication data stored in the buffer memory 41, the value of the variably set address K can be updated into K+1 and then stored and also the value of the accumulated value T of the number of communication data passing through the second output terminal can be updated into T+1 and then stored.

After the update/set process of the own address, etc. has been completed in steps S8 to S9, the switching signal generator 57 can generate the route switching command signal to switch the destination route of the communication data in the gate way selectively, and then send out the generated route switching command signal to the first route switching portion 23 via the communication line 31. In accordance with the route switching command signal sent out from the switching signal generator 57, the first route switching portion 23 can switch the destination route of the communication data being input via the first input terminal IN1 to the route OUT2A for the second output terminal OUT2. As a result, the transmitting/receiving I/F 39 can transmit the communication data, which have been input via the first input terminal IN1 and in which the variably set address K and the accumulated value T of the number of communication data passing through the second output terminal out of various information in the own gate way 19 have been updated selectively, to a succeeding gate way 19, in which "GW0" has been temporarily set as the destination address, via the second output terminal OUT2 (step S10).

On the contrary, if the destination address has not coincided with its own address as a result of the coincidence determination in step S6, i.e., if, after being circulated in one or more than two LANs, the communication data including the cyclic command frame as the contents have been sent back to the gate way 19, in which the update/set process of its own address has already completed, the arithmetic unit 47 can calculate R+1 by incrementing by one the accumulated value R of the number of communication data passing through the first output terminal, which has been interpreted by the decoder 43 and then sent out therefrom, and then send out the accumulated value R+1 of the number of communication data passing through the first output terminal to the buffer memory 41 (step S11). Accordingly, out of the description contents in the communication data stored in the buffer memory 41, the value of the accumulated value R of the number of communication data passing through the first output terminal can be updated into R+1 and then stored.

Next, the arithmetic unit 47 can read the accumulated value R of the number of communication data passing through the first output terminal and the accumulated value T of the number of communication data passing through the second output terminal, both are included in the communication data stored in the buffer memory 41, and then determine whether or not R and T coincide with each other (step S12). If R and T have coincided with each other as a result of this determination, i.e., if the communication data which have passed through the second output terminal OUT2 have been returned to the gate way 19 again and then are now going to pass through the first output: terminal OUT1 of the gate way 19, the arithmetic unit 47 can set both values of the accumulated value R of the number of communication data passing through the first output terminal and the accumulated value T of the number of communication data passing through the second output terminal, both stored in the buffer memory 41, to "0s" (step S13). At that time, the transmitting/receiving I/F 39 can transmit the communication data, in which both values of the accumulated value R of the number of communication data passing through the first output terminal and the accumulated value T of the number of communication data passing through the second output terminal out of various information have been updated selectively, toward a succeeding gate way 19, in which "GW0" has been temporarily set as the destination address, via the first output terminal OUT1 (step S14).

In contrast, unless R and T have coincided with each other as a result of this determination, i.e., unless the communication data which have passed through the second output terminal OUT2 of the gate way 19 have been returned to the gate way 19 yet, the transmitting/receiving I/F 39 can transmit the communication data, in which the value of the accumulated value R of the number of communication data passing through the first output terminal out of various information have been updated selectively, toward the succeeding gate way 19, in which "GW0" has been temporarily set as the destination address, via the first output terminal OUT1 (step S14). Where the case where the communication data which have passed through the second output terminal OUT2 of the gate way 19 have not been returned to the gate way 19 yet will be caused in the third gate way 19-3, as shown in FIG. 1, for example, when the third LAN 7 is connected to the first LAN 3 via the second gate way 19-2 and also the fourth LAN 9 is connected to the third LAN 7 via the third gate way 19-3.

On the other hand, if the destination address and its own address have coincided with each other in the relay station which has received the communication data as a result of the state determination in step S7 and the lock flag (LF) has been in its write disable state (LF=1) of the own address, i.e., if the communication data which include the cyclic command frame as the contents have been sent back to the root hub 15-0 as the source, the decoder 43 in the root hub 15-0 can recognize an event that the address set process has been normally completed, then invert the lock flag (LF) into its write enable state (LF=0) of its own address once, and then update/set its own address to "RH0" (step S15). After such updating/setting, the lock flag (LF) is inverted into its write disable state (LF=1) of the own address once again. In answer to this, the transmitting/receiving I/F 39 in the root hub 15-0 can transmit a set-normally-end signal which informs that the address set process has been normally completed to the SCU 17, and the SCU 17 when received the set-normally-end signal can end all the address set processes normally.

Figure 6:
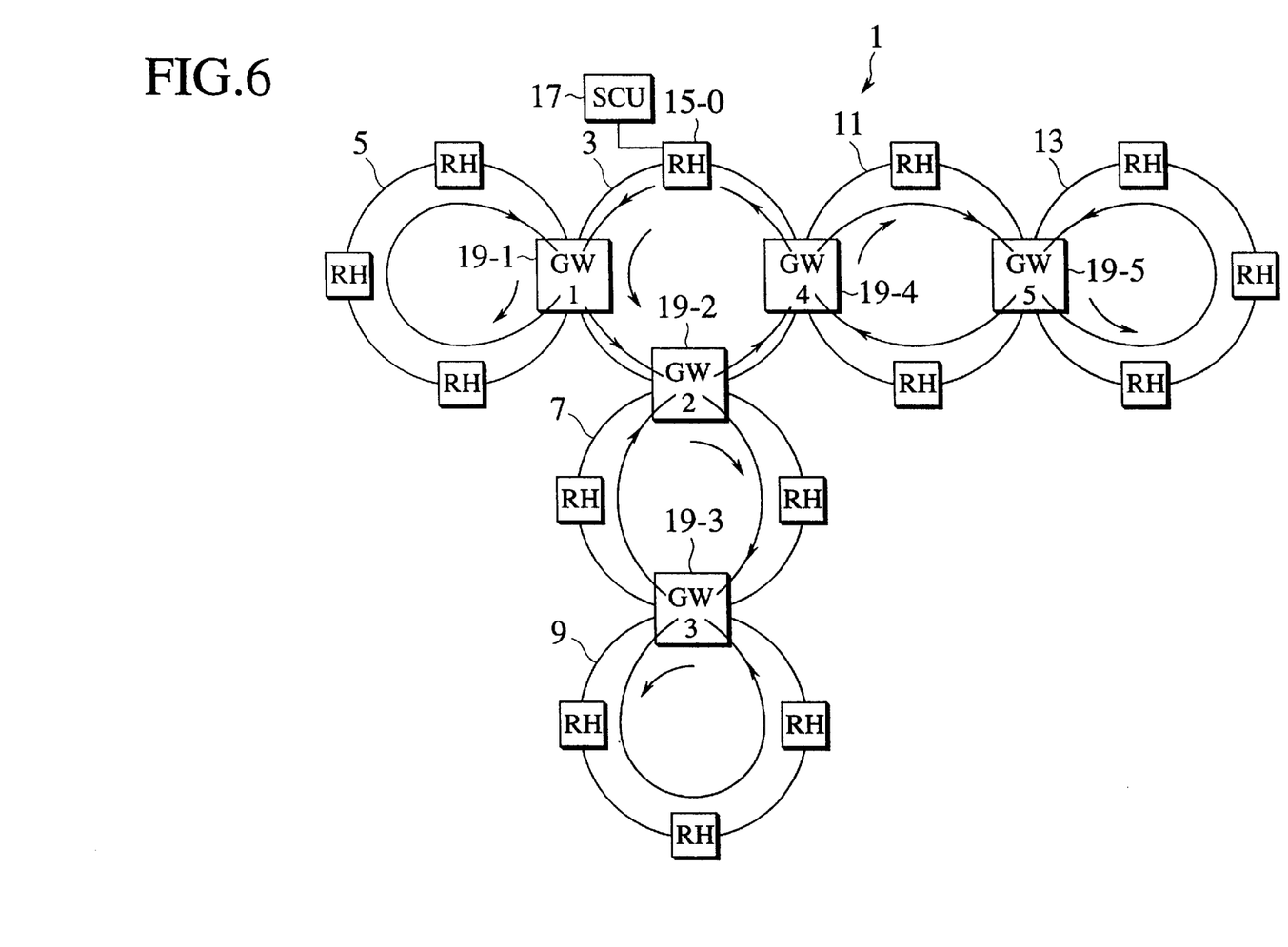
FIG. 6 is a view showing passing routes of communication data in accordance with the cyclic sequence when own addresses are allocated and set respectively to relay stations by using the address setting method according to the present invention.

If a plurality of gate ways 19 or the root hubs 15-0 which exist on the routes drawn with a single stroke of the pen, as indicated by solid arrow lines shown in FIG. 6, execute the above address set processes sequentially in the order of the routes drawn with the single stroke of the pen, their own addresses can be set to a plurality of gate ways 19 positioned as the relay stations respectively so as to enable mutual discrimination of their identity.

And, their own addresses which are set to the plurality of gate ways 19 respectively are described in the route address describing area in the communication data as the route addresses, for example, when data exchange is carried out between the root hubs which belong to different LANs respectively. More particularly, their own addresses of the gate ways 19 which exist at the branch points of the communication routes from the root hub as the source to the root hub as the destination are described as the route addresses in passing order, so that the communication routes of the communication data can be uniquely designated by the route addresses.

In this way, according to the address set method according to the present invention, the relay stations whose own addresses coincide with the destination address of the received communication data and also whose write enable states of their own address stored in the state storing means are in their write enable states can update their own addresses into the variable set address value described in the variable set address describing area of the communication data, then update their write enable states of their own addresses into their write disable states, then execute predetermined calculation of the variably set address values described in the variable set address describing area of the communication data, then describe the variably set address values calculated by this calculation in the variable set address describing area of the communication data, and then transmit the communication data in which the variably set address values are rewritten toward the next relay stations so as to circulate through the plurality of relay stations sequentially. Therefore, their own addresses can be set to a plurality of relay stations respectively by simple process procedures and also throughput as a whole communication system can be improved remarkably in setting the address.

The present invention is not limited to the example in the above embodiment and can be implemented as appropriate modified embodiments within present claims.

More particularly, for example, in the embodiment, the case has been explained where the SCU which manages collectively the process for allocating/setting their own addresses to a plurality of relay stations respectively is connected to any one of the root hubs RH belonging to any one of networks out of plural ring type networks. But, the present invention is not limited to this embodiment and the address setting/managing function of the SCU may be incorporated into any one of root hubs RH as its function to construct the communication system according to the present invention.

Also, in the above embodiment, the case has been explained where the SCU which manages collectively the process for allocating/setting their own addresses to a plurality of relay stations respectively is connected to any one of the root hubs RH belonging to any one of networks out of plural ring type networks. However, the present invention is not limited to this embodiment, but the communication system according to the present invention may be constructed by installing the address setting/managing function of the SCU and the communication data transmitting function of the root hubs RH as the destination stations into the gate ways as the relay stations as their function.

In addition, in the above embodiment, if the total number of the relay stations is registered in advance in the SCU and also the SCU can collate the total number of the registered relay stations with the variably set address values described in the variably set address describing area in the communication data returned to the original relay station when the communication data has been returned to the SCU after they have been circulated in the communication system, it can be easily checked whether or not their own addresses have been allocated/set to all relay stations without omission.

In the end, if the SCU is constructed such that it can retrieve the relay stations in which the write enable/disable states of their own addresses stored in the state storing means are in their write enable states, the number of the relay stations in which their own addresses have not been set yet can also be grasped.

It should be understood that many modifications and adaptations of the invention will become apparent to those skilled in the art and it is intended to encompass such obvious modifications and changes in the scope of the claims appended hereto.

What is claimed is:

1. An address setting method for a communication system including a plurality of ring type networks mutually connected via a plurality of relay stations in a data exchangeable manner, said plurality of relay stations setting their own addresses by sequentially circulating communication data between the plurality of relay stations so as to enable mutual discrimination of their identity, the method comprising the steps of:

initializing addresses respectively stored in address memories of the plurality of relay stations to a predetermined value common to the plurality of relay stations, and initializing address write enable/disable states respectively stored in enable/disable state memories of the plurality of relay stations into write enable states, when an address setting process for the plurality of relay stations is started;

transmitting the communication data to a respective relay station, said transmitted communication data having the predetermined value common to the plurality of relay stations described in a destination address area corresponding to a destination address of the respective relay station and having an initial value described in a variably set address area corresponding to a variably set address to be set on the respective relay station; and updating an address stored in the address memory of the respective relay station to be the variably set address value described in the variably set address area and updating an address write enable/disable state stored in the state enable/disable memory of the respective relay station to be a write disable state, executing predetermined calculations to calculate a new variably set address, updating the variably set address area with the new variably set address calculated by the predetermined calculations, and transmitting the communication data including the new variably set address to a succeeding relay station, when the address of respective relay station coincides with the destination address of received communication data and an address write/enable stored in the enable/disable state memory is in a write enable state.

2. An address setting method according to claim 1, wherein:

the plurality of relay stations have four input/output terminals including first and second input terminals and first and second output terminals, and connect a pair of networks by connecting the first input terminal and the first output terminal to one network and connecting the second input terminal and the second output terminal to the other network of the pair of networks, the communication data further comprises a first area in which an accumulated value of a number of the communication data passing through the second output terminal is described, and a second area in which an accumulated value of a number of the communication data passing through the first output terminal after the communication data has passed through the second output terminal is described, the communication data transmitted to the respective relay station includes the predetermined value common to the plurality of relay stations described in the destination address area, the initial value described in the variably set address area corresponding to a variably set address to be set on the respective relay station, the accumulated value of the number of the communication data passing through the second output terminal described in the first area, and the accumulated value of the number of the communication data passing through the first output terminal after the communication data has passed through the second output terminal described in the second area, when the destination address of the received communication data coincides with the address of the respective relay station and the address write enable/disable state stored in the enable/disable state memory is in a write enable state, updating the address stored in the address memory of the respective relay station to be the variably set address value described in the variably set address area updating the address write enable/disable state stored in the enable/disable state memory of the respective relay station to be the write disable state, executing predetermined calculations to calculate the new variably set address, updating the variably set address field with the new variably set address calculated by the predetermined calculations, describing the accumulated value of the number of the communication data passing through the second output terminal in the first area of the communication data, and transmitting the communication data having the new variably set address value and the accumulated value of the number of the communication data passing through the second output terminal to a succeeding relay station, and otherwise, when the destination address of the received communication data does not coincide with the address of the respective relay station, describing the accumulated value of the number of the communication data passing through the first output terminal in the second area and then transmitting the communication data in which the accumulated value of the number of the communication data passing through the first output terminal has been rewritten to a succeeding relay station.

3. An address setting method according to claim 2, wherein:

when the destination address of the received communication data does not coincide with the address of the respective relay station, respective relay station determines whether or not the accumulated value of the number of the communication data passing through the first output terminal coincides with the accumulated value of the number of the communication data passing through the second output terminal, transmits the communication data in which both accumulated values are not changed to the succeeding relay station if both the accumulated values do not coincide with each other, and otherwise transmits the communication data, in which both accumulated values are updated into any initial value, to the succeeding relay station if both the accumulated values coincide with each other.

4. An address setting method according to claim 1, further comprising:

a source relay station connected to any one of the plurality of ring type networks, and configured to start the transmission of the communication data to the respective relay station of the plurality of relay stations, after the steps of initializing the addresses and write enable/disable states of the plurality of relay stations, wherein the source relay station initializes its own address stored in an address memory into the predetermined value common to the plurality of relay stations and initializes its own address write enable/disable stored in an enable/disable state memory into a write disable state prior to transmitting the communication data to the perspective relay station, and when the destination address of the communication data received by the source relay station coincides with the address of the source relay station and the address write enable/disable state stored in the enable/disable state memo is in a write disable state, the source relay station inverts the address write enable/disable state stored in the enable/disable state memory into the write enable state once, updates the address stored in the address memory into a previously set predetermined value, inverts the address write enable/disable state into the write disable state again, and then terminates the address setting method normally.

5. A communication system including a plurality of ring type networks mutually connected via a plurality of relay stations in a data exchangeable manner and in which addresses of the plurality of relay stations are respectively set by sequentially circulating communication data between the plurality of relay stations so as to enable mutual discrimination of their identity, wherein the communication data comprises:

a destination address area in which a relay station destination is described; and a variably set address area in which a variably set address to be set on a respective relay station of the plurality of relay stations is described, wherein each of the plurality of relay stations comprises:

address storing means for storing a relay station address;

state storing means for storing a write enable/disable state corresponding to the relay station address:

initializing means for initializing the relay station address stored in the address storing means to a predetermined value common to the plurality of relay stations, and for initializing the address write enable/disable state stored in the state storing means into a write enable state, when an address process for the plurality of relay stations [are] is started;

communication data receiving means for receiving the communication data;

first updating means for updating the relay station address stored in the address storing means to be the variably set address described in the variably set address area and for updating the address write enable/disable state stored in the state storing means to be a write disable state, when the destination address of the communication data received by the communication data receiving means coincides with the relay station address stored in the address storing means and the write enable/disable state stored in the state storing means is in a write enable state;

calculating means for executing predetermined calculations to calculate a new variably set address;

second updating means for updating the variably set address field with the new variably set address calculated by the calculating means; and means for transmitting the communication data in which the variably set address has been rewritten to a succeeding relay station.

6. A communication system according to claim 5, wherein:

the plurality of relay stations have four input/output terminals including first and second input terminals and first and second output terminals, and connect a pair of networks by connecting the first input terminal and the first output terminal to one network and connecting the second input terminal and the second output terminal to other network of the pair of networks, the communication data further comprises a first area in which an accumulated value of a number of the communication data passing through the second output terminal is described, and a second area in which an accumulated value of a number of the communication data passing through the first output terminal after the communication data has passed through the second output terminal is described, the communication data transmitted to the respective relay station includes the predetermined value common to the plurality of relay stations described in the destination address area, the initial value described in the variably set address area corresponding to a variably set address to be set on the respective relay station, the accumulated value of the number of the communication data passing through the second output terminal described in the first area, and the accumulated value of the number of the communication data passing through the first output terminal after the communication data has passed through the second output terminal described in the second area, and when the destination address of the received communication data coincides with the address of the respective relay station and the address write enable/disable state stored in the state storing means is in the write enable state, the first updating means updates the address stored in the address storing means of the respective relay station to be the variably set address described in the variably set address area, and updates the write enable/disable state stored in the state storing means of the respective relay station to be the write disable state, the calculating means calculates the new variably set address, and the second updating means updates the variably set address field with the new variably set address calculated by the calculating means, and describes the accumulated value of the number of the communication data passing through the second output terminal in the first area of the communication data, and the transmitting means transmits the communication data having the new variably set address value and the accumulated value of the number of the communication data passing through the second output terminal, and otherwise, when the destination address of the received communication data does not coincide with the address of the respective relay station, the respective relay station describes the accumulated value of the number of the communication data passing through the first output terminal in the second area and then transmits the communication data having the accumulated value of the number of the communication data passing through the first output terminal to a succeeding relay station.

7. A communication system according to claim 6, wherein:

when the destination address of the received communication data does not coincide with the address of the respective relay station, the respective relay station determines whether or not the accumulated value of the number of the communication data passing through the first output terminal coincides with the accumulated value of the number of the communication data passing through the second output terminal, transmits the communication data in which both accumulated values are not changed to the succeeding relay station if both the accumulated values do not coincide with each other, and otherwise transmits the communication data, in which both the accumulated values are updated into any initial value, to the succeeding relay station if both the accumulated values coincide with each other.

8. A communication system according to claim 5, further comprising:

a source relay station connected to any one of the plurality of ring type networks, and configured to start the transmission of the communication data to the respective relay station of the plurality of relay stations, after the initializing means initializes the addresses and write enable/disable states of the plurality of relay stations, wherein the source relay station initializes its own address stored in an address storing means into the predetermined value common to the plurality of relay stations and initializes its own address write enable/disable state stored in a state storing means into a write disable state, prior to transmitting the communication data to the respective relay station, and when the destination address of the communication data received by the source relay station coincides with the address of the source relay station and the address write enable/disable state stored in the state storing means is in a write disable state, the source relay station inverts the address write enable/disable state stored in the state storing means into the write enable state once, updates the address stored in the address storing means into a previously set predetermined value, inverts the address write enable/disable state into the write disable state again, and then terminates address setting method normally.

9. A communication system including a plurality of ring type networks mutually connected via a plurality of relay stations in a data exchangeable manner and in which addresses of the plurality of relay stations are respectively set by sequentially circulating communication data between the plurality of relay stations so as to enable mutual discrimination of their identity, wherein the communication data comprises:

a destination address area in which a relay station destination is described; and a variably set address area in which a variably set address to be set on a respective relay station of the plurality of relay stations is described, wherein each of the plurality of relay stations comprises:

an address memory configured to store a relay station address;

an enable/disable state memory configured to store a write enable/disable state corresponding to the relay station address;

an initializing mechanism configured to initialize the relay station address stored in the address memory to a predetermined value common to the plurality of relay stations, and to initialize the address write enable/disable state stored in the enable/disable state memory into a write enable state, when an address process for the plurality of relay stations is started;

a communication data receiver configured to receive the communication data;

a first updating mechanism configured to update the relay station address stored in the address memory to be the variably set address described in the variably set address area and to update the address write enable/disable state stored in the enable/disable state memory to be a write disable state, when the destination address of the communication data received by the communication data receiver coincides with the relay station address stored in the address memory and the write enable/disable state stored in the enable/disable state memory is in a write enable state;

a calculating mechanism configured to execute predetermined calculations to calculate a new variably set address;

a second updating mechanism configured to update the variably set address field with the new variably set address calculated by the calculating mechanism; and a transmitter configured to transmit the communication data in which the variably set address has been rewritten to a succeeding relay station.

10. A communication system according to claim 9, wherein:

the plurality of relay stations have four input/output terminals including first and second input terminals and first and second output terminals, and connect a pair of networks by connecting the first input terminal and the first output terminal to one network and connecting the second input terminal and the second output terminal to other network of the pair of networks, the communication data further comprises a first area in which an accumulated value of a number of the communication data passing through the second output terminal is described, and a second area in which an accumulated value of a number of the communication data passing through the first output terminal after the communication data has passed through the second output terminal is described, the communication data transmitted to the respective relay station includes the predetermined value common to the plurality of relay stations described in the destination address area, the initial value described in the variably set address area corresponding to a variably set address to be set on the respective relay station, the accumulated value of the number of the communication data passing through the second output terminal described in the first area, and the accumulated value of the number of the communication data passing through the first output terminal after the communication data has passed through the second output terminal described in the second area, and when the destination address of the received communication data coincides with the address of the respective relay station and the address write enable/disable state stored in the enable/disable state memory is in the write enable state, the first updating mechanism updates the address stored in the address memory of the respective relay station to be the variably set address described in the variably set address area, and updates the write enable/disable state stored in the enable/disable state memory of the respective relay station to be the write disable state, the calculating mechanism calculates the new variably set address, and the second updating mechanism updates the variably set address field with the new variably set address calculated by the calculating mechanism, and describes the accumulated value of the number of the communication data passing through the second output terminal in the first area of the communication data, and the transmitter transmits the communication data having the new variably set address value and the accumulated value of the number of the communication data passing through the second output terminal, and otherwise, when the destination address of the received communication data does not coincide with the address of the respective relay station, the respective relay station describes the accumulated value of the number of the communication data passing through the first output terminal in the second area and then transmits the communication data having the accumulated value of the number of the communication data passing through the first output terminal to a succeeding relay station.

11. A communication system according to claim 10, wherein:

when the destination address of the received communication data does not coincide with the address of the respective relay station, the respective relay station determines whether or not the accumulated value of the number of the communication data passing through the first output terminal coincides with the accumulated value of the number of the communication data passing through the second output terminal, transmits the communication data in which both accumulated values are not changed to the succeeding relay station if both the accumulated values do not coincide with each other, and otherwise transmits the communication data, in which both the accumulated values are updated into any initial value, to the succeeding relay station if both the accumulated values coincide with each other.

12. A communication system according to claim 9, further comprising:

a source relay station connected to any one of the plurality of ring type networks, and configured to start the transmission of the communication data to the respective relay station of the plurality of relay stations, after the initializing mechanism initializes the addresses and write enable/disable states of the plurality of relay stations, wherein the source relay station initializes its own address stored in an address memory into the predetermined value common to the plurality of relay stations and initializes its own address write enable/disable state stored in a enable/disable state memory into a write disable state, prior to transmitting the communication data to the respective relay station, and when the destination address of the communication data received by the source relay station coincides with the address of the source relay station and the address write enable/disable state stored in the enable/disable state memory is in a write disable state, the source relay station inverts the address write enable/disable state stored in the enable/disable state memory into the write enable state once, updates the address stored in the address memory into a previously set predetermined value, inverts the address write enable/disable state into the write disable state again, and then terminates the address setting method normally.

* * * * *

UNITED STATES PATENT AND TRADEMARK OFFICE
CERTIFICATE OF CORRECTION

PATENT NO. : 6,138,165

DATED : October 24, 2000

INVENTOR(S): Yoshinori Nakatsugawa

It is certified that an error appears in the above-identified patent and that said Letters Patent is hereby corrected as shown below:

Column 2, line 16, change "settingmethod" to --setting method--.
Column 6, line 29, change "the." to --the--;
 line 45, change "own." to --own--.
Column 7, line 28, change "address." to --address--;
 line 29, change "into." to --into--.
Column 9, line 62, insert --25-- after "portion".
Column 10, line 47, change "turn" to --turned--.
Column 11, line 34, change "own" to --its--.
Column 12, line 10, change "are set" to --a reset--;
 line 39, delete "own".
Column 13, line 61, change "own" to --the--.
Column 14, line 31, change "the." to --the--;
 line 59, change "output:" to --output--.
Column 18, line 45, insert --the-- after "station,".
Column 19, line 2, insert --state-- after "/disable";
 line 10, change "memo" to --memory--.

Signed and Sealed this

Twenty-second Day of May, 2001

Attest:

NICHOLAS P. GODICI

Attesting Officer

Acting Director of the United States Patent and Trademark Office